United States Patent [19]  
Nonnenmann et al.

[11] 4,152,302  
[45] May 1, 1979

[54] SUPPORT MATRIX FOR A CATALYTIC REACTOR FOR SCRUBBING EXHAUST GASES IN INTERNAL COMBUSTION ENGINES

[75] Inventors: Manfred Nonnenmann, Schwieberdingen; Helmut Bardong, Stuttgart; Klaus Haller, Korntal; Bohumil Humpolik, Gerlingen; Vlastimil Kluna, Kornwestheim, all of Fed. Rep. of Germany

[73] Assignee: Süddeutsche Kühlerfabrik Julius Fr. Behr GmbH & Co. KG, Stuttgart, Fed. Rep. of Germany

[21] Appl. No.: 924,904

[22] Filed: Jul. 14, 1978

[30] Foreign Application Priority Data

Jul. 26, 1977 [DE] Fed. Rep. of Germany ....... 2733640

[51] Int. Cl.² .................. B01J 23/74; B01J 35/02

[52] U.S. Cl. .................. 252/472; 252/477 R; 423/213.5

[58] Field of Search .................. 252/472, 477 R

[56] References Cited

U.S. PATENT DOCUMENTS 4,098,722   7/1978   Cairns et al. .................. 252/477 R

FOREIGN PATENT DOCUMENTS 2302746   7/1974   Fed. Rep. of Germany.

Primary Examiner—W. J. Shine  
Attorney, Agent, or Firm—Browdy and Neimark

[57] ABSTRACT

A support matrix for a catalytic reactor for scrubbing exhaust gases in internal combustion engines, made of high-temperature resistant steel made up of alternating steel panels, at least one of which is corrugated, and at least one of which is provided with projections or depressions interlocking with at least one adjacent steel panel.

13 Claims, 13 Drawing Figures

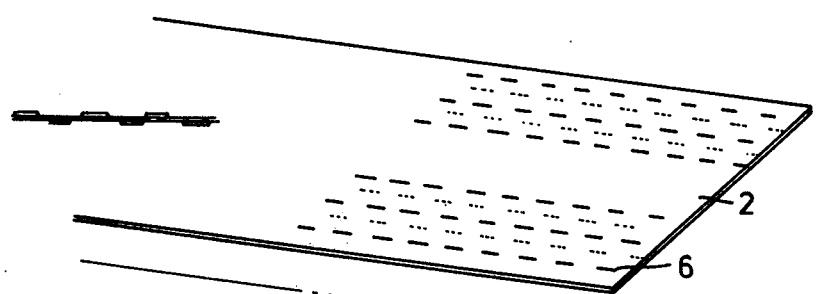
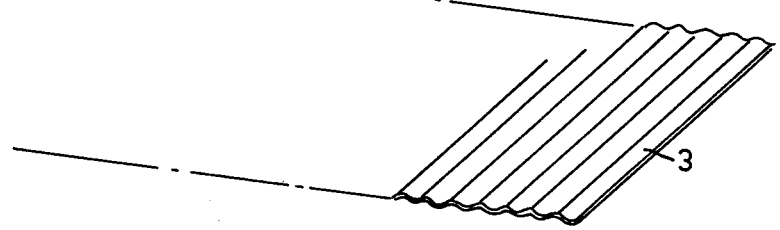
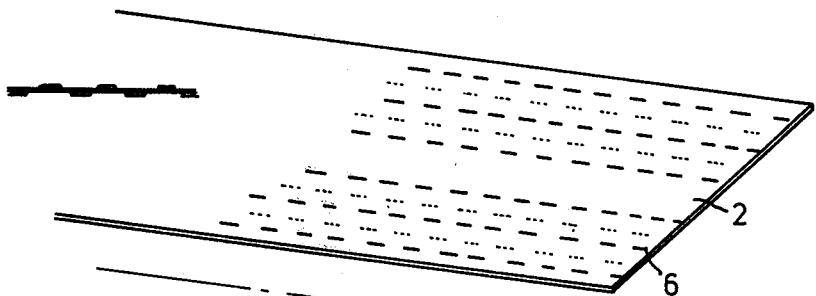
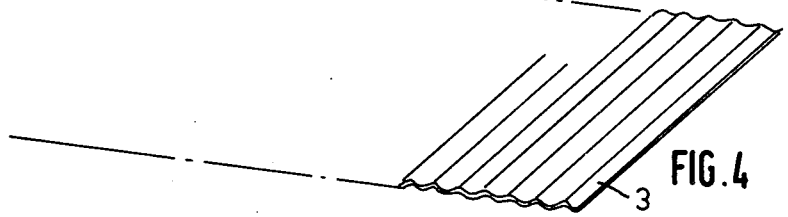
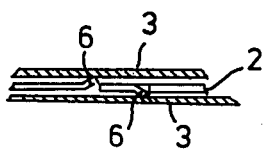
FIG. 4
FIG. 5

SUPPORT MATRIX FOR A CATALYTIC REACTOR FOR SCRUBBING EXHAUST GASES IN INTERNAL COMBUSTION ENGINES

FIELD OF THE INVENTION

The invention relates to a support matrix for a catalytic reactor for scrubbing exhaust gases in internal combustion engines, especially gasoline engines in motor vehicles, made of high temperature resistant steel, composed of alternating steel panels, at least one of which is corrugated, whereby the steel panels are coated with catalyst before the support matrix is assembled, or coated after the support matrix has been assembled.

BACKGROUND OF THE INVENTION

A support matrix of this type is known from German Offenlegungsschrift No. 23 02 746.

In this known support matrix, the individual layers of steel panels can be welded together. The support matrix itself can be retained in a jacket by holding means, preferably disposed in front of the end of the matrix, this holding means consisting for example of intersecting struts, wires, or rods, or a wire mesh.

Welding the individual layers of steel paneling is a costly procedure. The holding means at the ends of the matrix do not always suffice to prevent a mutual axial displacement of the individual layers of the steel panels in the matrix.

SUMMARY OF THE INVENTION

An object of the invention is to provide a support matrix of the type described hereinabove, such that axial displacement of the layers is reliably prevented and, moreover, if possible, a turbulent flow of gases in the channels in the matrix is produced.

This object is achieved according to the invention in a support matrix of the type described hereinabove essentially by virtue of the fact that at least one steel panel or steel strip is provided with projections and/or depressions, and by the fact that these projections or depressions interlock with at least one adjacent steel panel or steel strip.

According to one embodiment of the invention, the projections or depressions are in the form of tabs partially bent upward and downward from the plane of the steel panel, whereby the tabs point parallel to the lengthwise axis and opposite the coiling direction, but can also point parallel to the lengthwise axis, in or against the coiling direction.

The adjacent steel panel is provided with holes, into which the projecting tabs of one steel panel fit.

According to an improvement of this embodiment of the invention, the tabs are oriented perpendicularly to the lengthwise axis of the steel panel, whereby they again project in various arrangements upward and downward from the steel panel, and can also point in, against, or both in and against the flow direction of the gas.

The invention also includes all possible combinations of tabs, projecting upward and downward, and oriented in, and perpendicular to, the lengthwise axis of the steel panel, whereby the tabs oriented parallel to the lengthwise axis of the steel panel preferably serve to retain the matrix, which the tabs which point at right angles to the lengthwise axis of the steel panel serve primarily for generating turbulence.

To generate turbulence, whereby shortening the structural length of the matrix is possible, it can be advantageous to provide in addition to the tabs serving for fastening and oriented preferably parallel to the lengthwise axis of the steel panel, and corresponding holes in a corrugated strip, appropriate holes only in the smooth strip instead of the tabs oriented preferably at right angles to the lengthwise axis. A turbulent effect is also produced if additional holes are provided only in a smooth strip or only in a corrugated strip.

According to a modified embodiment of the invention, the tabs of the steel panel are caused to project in such manner that they notch into adjacent upper or lower panels.

According to another embodiment of the invention, the tabs at the edge of the smooth steel panel are bent alternately upward and downward, so that they grip the adjacent corrugated steel panel in the upper and lower panels.

According to yet another embodiment, the projections and depressions are made in the form of grooves, with the groove of a smooth steel panel meshing with the upper groove of a corrugated steel panel and the lower groove of the corrugated steel panel meshing with the groove of the smooth steel panel.

As shown in another embodiment, the grooves in the corrugated panel, which are very advantageous for turbulence, can be replaced by cutting the individual depressions or impressions on both sides of each corrugation of the corrugated panel, which combine to form the grooves, thus changing their shape to that of arcuate segments.

The situation is considerably simplified if two similar steel panels, preferably corrugated, are used wherein the projections and/or depressions consist of arrow-shaped corrugations.

In an advatageous design of this embodiment, the corrugations of two adjacent steel panels are inclined opposite to one another and form channels located crosswise.

Another advantageous embodiment of the invention is produced by providing a corrugated steel panel with transverse corrugations and with lengthwise tabs which run at right angles to the cross corrugations.

In another embodiment, nails or staples are provided in the steel panels or steel strips, whereby small passageways are formed in the individual steel panels, so that axial displacement is inhibited not only in the case in which the nails or staples remain in the matrix, but also in the case where, for example, the nails are removed again.

BRIEF DESCRIPTION OF THE DRAWINGS

Further advantages and features of the invention will be discussed in greater detail with reference to the drawings, which show the various embodiments schematically.

FIG. 4 is another embodiment;

FIG. 5 is the embodiment shown in FIG. 4, in partial cross section;

DESCRIPTION OF PREFERRED EMBODIMENTS

Figure 1:
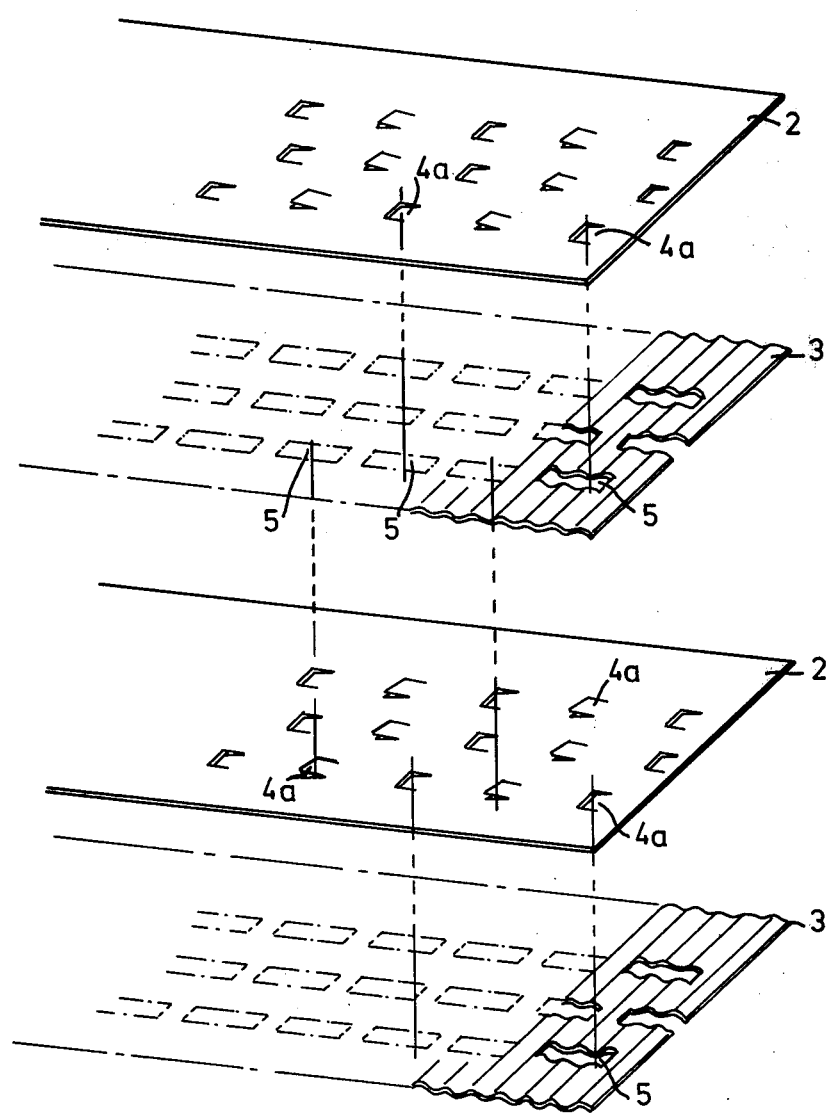
FIG. 1 is an exploded view of a first embodiment of the invention.

A matrix 1 according to the invention is generally manufactured of steel panels 2 and 3. Smooth steel panels 2 alternate with corrugated steel panels 3. According to the invention, smooth steel panels 2 are provided with tabs 4a and 4b, projecting part way upward and downward out of the plane of steel panels 2. Corrugated steel panels 3 are provided with holes 5, preferably lengthwise slots. When steel panels 2 and 3 are assembled to form a matrix, projecting tabs 4a and 4b fit into holes 5 of the upper and lower adjacent panels. Holes 5 can be punched and tabs 4a and 4b bent in simple fashion by machinery, so that the individual steel panels 2 and 3 can be connected together without fastening means or welding processes, whereby the engagement of tabs 4a and 4b in holes 5 prevents axial displacement of steel panels 2 relative to steel panels 3 (and vice versa) in a reliable fashion.

In the embodiment shown in FIG. 1, projecting tabs 4a can be seen in the direction of the lengthwise axis of steel panels 2 and 3. The embodiment shown in FIG. 2 differs essentially from the embodiment in FIG. 1 only in the orientation of projecting tabs 4a. According to FIG. 2, tabs 4b point at right angles to the lengthwise axis of steel panel 2. Tabs 4b are arranged in lines and rows, whereby the individual rows can be staggered with respect to one another. Accordingly, lengthwise holes 5 in steel panels 3 can also be staggered in rows. In the embodiments shown in FIGS. 1 and 2, tabs 4 and 4b in one line project in the same direction, while tabs 4a and 4b of the next line are bent in the opposite direction out of the plane of steel panel 3. However, the design can be such that the alternating arrangement of tabs 4a and 4b is in the form of a checkerboard.

Figure 3:
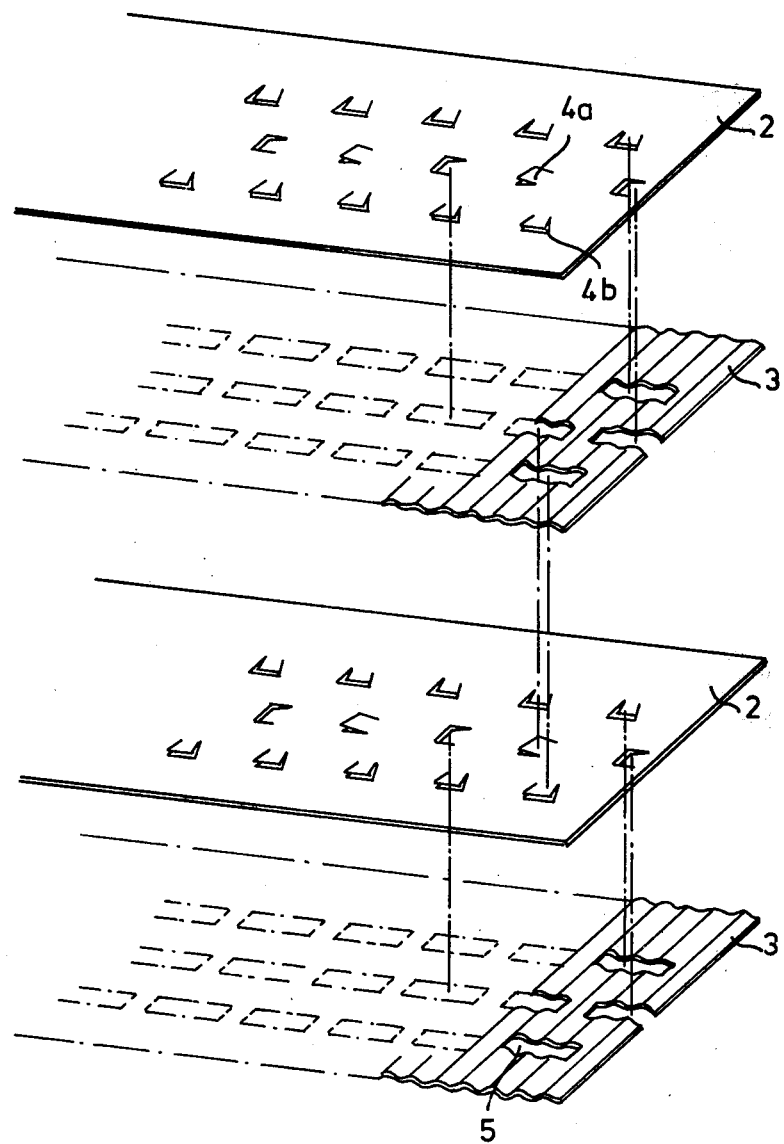
FIG. 3 is an embodiment which constitutes a combination of the examples shown in FIGS. 1 and 2.

The example according to FIG. 3 shows a design which contains upwardly and downwardly bent tabs, said tabs being oriented both parallel (4a) and vertically (4b) to the lengthwise axis of the steel panels.

In the embodiment according to FIG. 4 (and FIG. 5), steel panels 2 are provided with tabs 6, which are forced into steel panel 3 when steel panels 2 and 3 are would up to form a cylindrical matrix. FIG. 5 shows a cross section on an enlarged scale illustrating the alternating bends in tabs 6 of steel panel 2, which penetrate the matching surfaces of the adjacent turns of steel panels 3.

Figure 6:
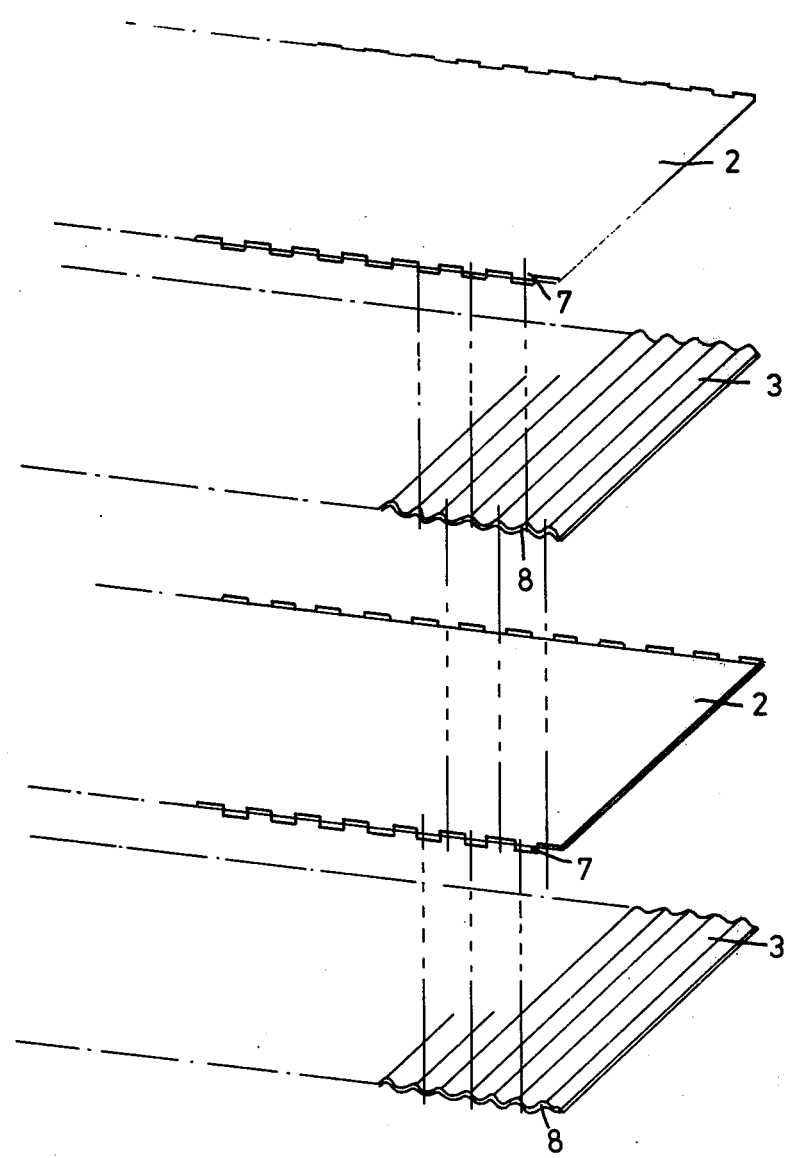
FIG. 6 is another embodiment.

A simplified embodiment is shown in FIG. 6. Here steel panels 2 have edge tabs 7, which can be bent for example on one side out of the plane of steel panel 2. Preferably, however, edge tabs 7 are bent alternately upward and downward out of the plane of steel panel 2. In this embodiment, the width of steel panel 2 is slightly greater than the width of steel panel 3, namely, by approximately twice the height of edge tabs 7. This ensures that the positions of steel panels 3 between the adjacent layers of steel panels 2 will be maintained in an axially non-displaceable manner by edge tabs 7 of adjacent steel panels 2, said tabs abutting edges 8 of steel panels 3.

Figure 7:
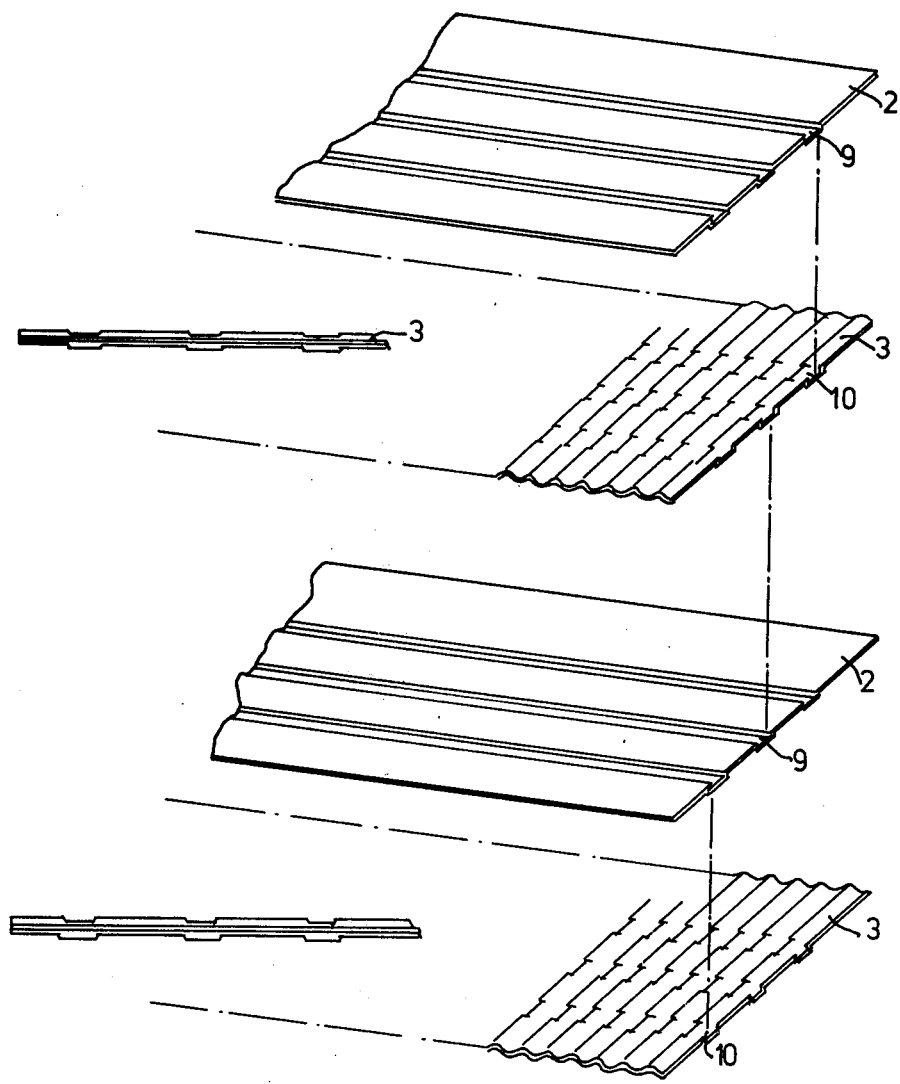
FIG. 7 is a modified embodiment.

In the embodiment shown in FIG. 7, grooves 9 are provided in smooth steel panel 2 and impressions 10 are provided in corrugated steel panel 3 which form grooves, whereby each groove 9 of smooth panel 2 meshes with an upper groove 10 of corrugated panel 3 and a lower groove 10 of corrugated panel 3 meshes with groove 9 of smooth panel 2.

Figure 8:
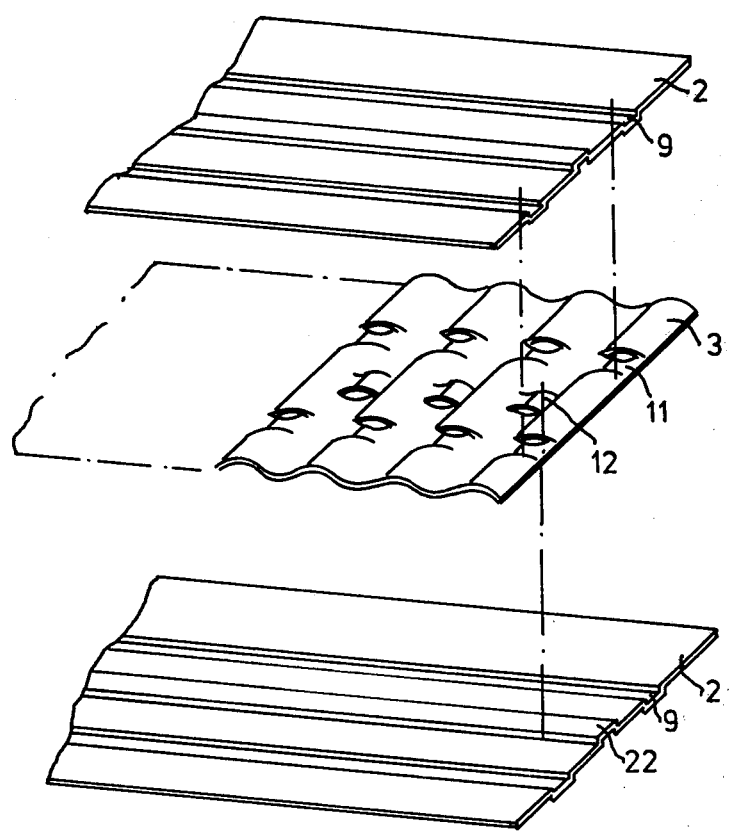
FIG. 8 is another modified embodiment.

The embodiment shown in FIG. 8 is a modification of FIG. 7, whereby the impressions which produce grooves 10 in FIG. 7 are replaced in the corrugation peaks of corrugated steel panel 3 by arcuate segments 11. Moreover, in this design, additional, similar arcuate segments 12 are provided in the troughs of the corrugations of the corrugated steel panel, and are staggered. Finally, the grooves in smooth panel 2 are disposed alternately upward 22 and downward 9, so that the latter can engage the grooves formed by arcuate segments 11 and 12.

Figure 9:
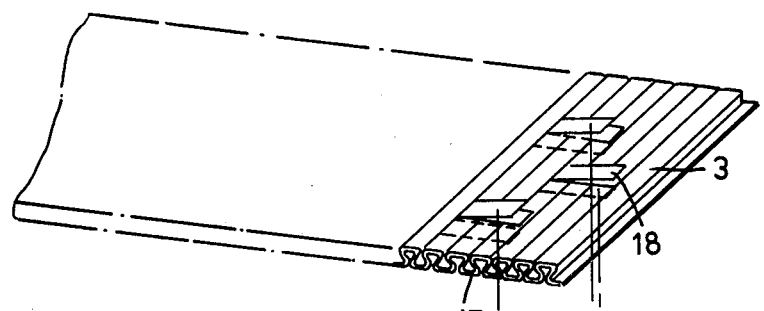
FIG. 9 is yet another embodiment.
Figure 10:
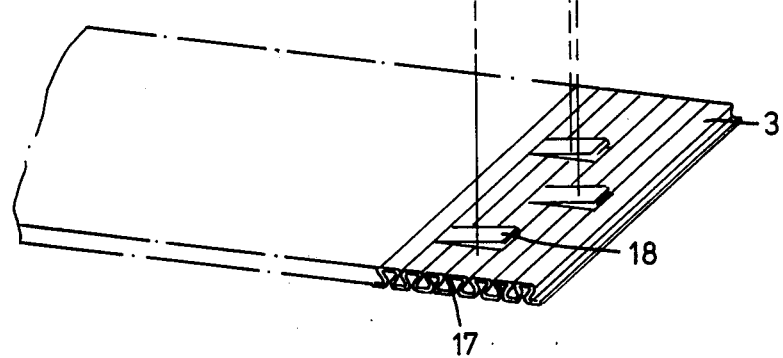
FIG. 10 is the matrix according to the embodiment shown in FIG. 9, in the rolled-up state.
Figure 10:
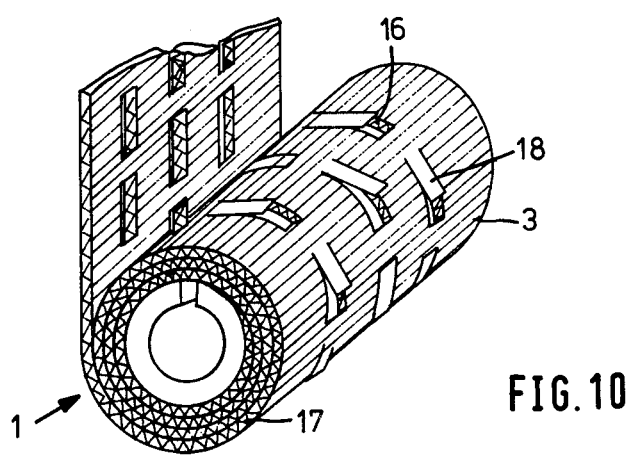

In the modified embodiment shown in FIG. 9, only one corrugated type of steel panel 3 is used. The corrugation is essentially produced by transverse corrugations 17. Tabs 18 are bent out from the total thickness of panel 3. These tabs engaging corresponding holes 16 formed by the bending of tabs 18, when steel panels 3 are rolled up as shown in FIG. 10. The direction of tabs 18 therefore runs parallel to the lengthwise axis of steel panel 3. In this design as well, lateral displacement of the individual turns relative to one another in the axial direction is reliably prevented.

Figure 11:
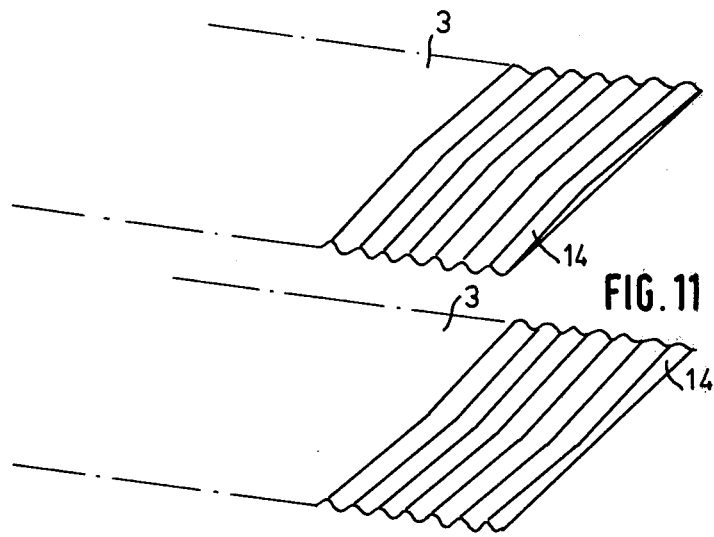
FIG. 11 is a modified embodiment.

Another embodiment of a matrix 1 according to the invention with similarly corrugated steel panels 3 is shown in FIG. 11. Corrugations are produced by arrow-shaped corrugations 14, whereby a matrix of adjacent strips runs in the opposite direction from arrow-shaped corrugations 14 when a matrix is assembled. The friction between two superimposed strips with corrugations inclined in opposite directions impedes axial displacement of the layers. The mutual arrangement of arrow-shaped corrugations 14 forms channels 15, running crosswise, which evoke an additional turbulent flow.

Figure 12:
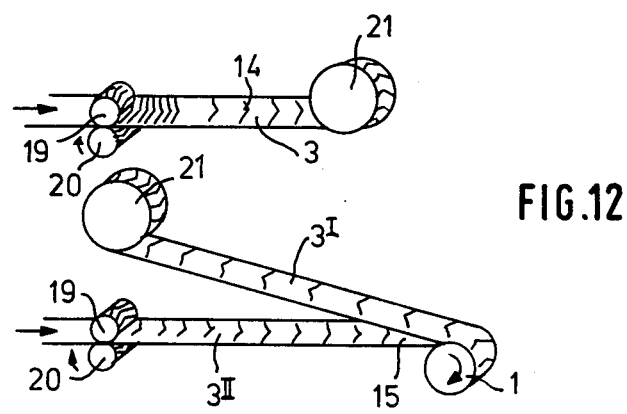
FIG. 12 is a diagram showing how the embodiment shown in FIG. 11 is made.

FIG. 12 shows how gears 19, 20 can make a corrugated panel 3 from a smooth strip according to the embodiment shown in FIG. 11. A first corrugated panel of this kind is wound up on a supply reel 21. Then a second strip is provided with corrugations 14 by the use of gears 19, 20 and the first panel with the arrows in the opposite direction, is fed to the second panel from supply reel 21, whereupon both panels are jointly wound up to form a matrix 1.

Figure 13:
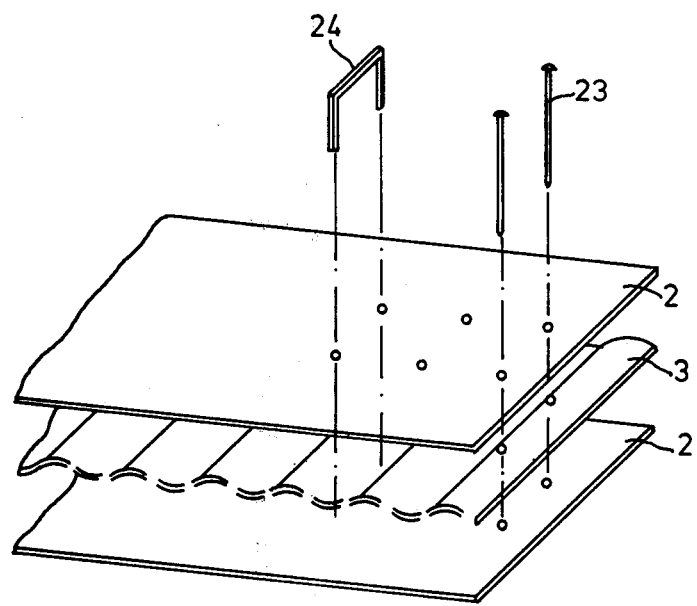
FIG. 13 is another modified embodiment.

FIG. 13 shows another embodiment wherein nails 23 or staples 24 are attached during or after the coiling of the steel panels 2 and 3, the nails or staples extending through several panels. Since small passageways already produced in steel panels 2, 3 by the introduction of nails 23 or staples 24 prevent axial displacement of steel panels 2, 3, it is also possible in this embodiment to remove e.g. staples 23 one more.

The invention is not limited to the embodiments shown and described. Thus, for example, matrices of flat steel panels 2 and 3 can be formed for example. The arrangement and design of transverse corrugations 17 according to FIG. 9, unlike the embodiment shown, can also be made U-shaped.

Figure 2:
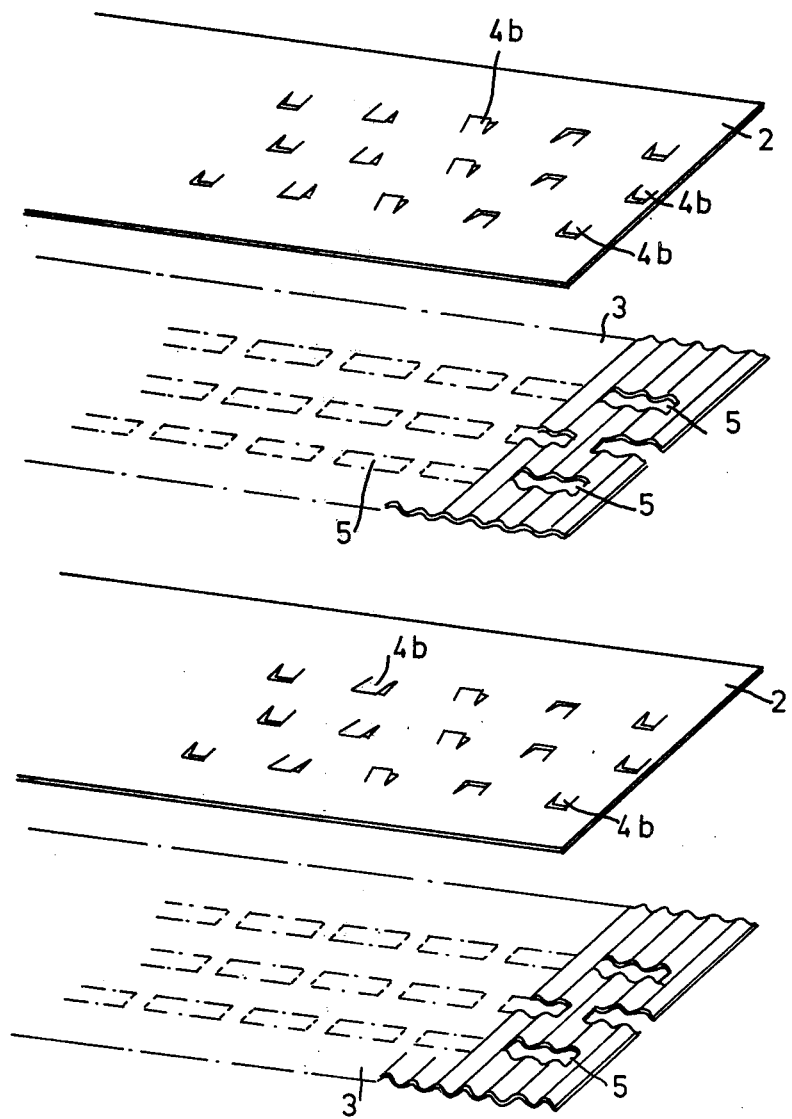
FIG. 2 in an embodiment which is a modification of FIG. 1.

Holes 5 in corrugated steel panel 3 and holes, preferably instead of tabs 4 in smooth steel panel 2 to produce turbulence, are not limited to the embodiments shown in FIGS. 1 to 3.

The invention thus comprises all modifications and improvements made by an individual skilled in the art as well as partial and subcombinations of the features and measures described and/or shown.

What is claimed is:

1. Support matrix for a catalytic reactor for scrubbing exhaust gases from internal combustion engines, especially gasoline engines of motor vehicles, of high temperature-resistant steel, comprising alternating steel panels coated with catalyst, at least one of said panels being corrugated, at least one steel panel being provided with projections and/or depressions, said projections and depressions interlocking with at least one adjacent steel panel.

2. Matrix according to claim 1, wherein said projections are in the form of tabs, stamped out and bent out of the plane of said steel panel.

3. Matrix according to claim 1, wherein said projections and/or depressions are made in the form of tabs bent out of the plane of said steel panel in the direction of the lengthwise axis of said steel panel and additional tabs, bent at right angles to the direction of the lengthwise axis.

4. Matrix according to claim 2 or 3, wherein the adjacent steel panel is provided with holes, into which said bent tabs engage.

5. Matrix according to claim 3, wherein especially said individual tabs which are bent at right angles to the direction of the lengthwise axis of said smooth steel panels are not there and for these there are holes in said smooth steel panels or the smooth steel panels remain at these places in the smooth condition whereby the holes can exist or can not exist in the alternating corrugated steel panels.

6. Matrix according to claim 2, wherein said tabs are bent both upwardly and downwardly so that they engage the adjacent upper and lower steel panels.

7. Matrix according to claim 2, wherein said tabs are bent alternatively upwardly and downwardly on the edge of said smooth steel panel, so that they laterally retain the corresponding adjacent corrugated steel panels above and below said smooth steel panel.

8. Matrix according to claim 1, wherein said projections and depressions are made in the form of grooves so that the lower portion of said grooves in said smooth steel panel engage a corresponding upper groove of the next lower corrugated steel panel, and the lower groove of said corrugated steel panel engages the groove of the next lower smooth steel panel.

9. Matrix according to claim 8, wherein said grooves in said corrugated steel panel are made in the form of arcuate segments, into which adjacent grooves of said smooth steel panel mesh.

10. Matrix according to claim 1, wherein said projections and/or depressions in said steel panels consist of arrow-shaped corrugations.

11. Matrix according to claim 10, wherein said two adjacent steel panels are corrugated and said corrugations are inclined in opposite directions with respect to one another to form channels located crosswise therebetween.

12. Matrix according to claim 1 wherein said corrugated steel panel is provided with transverse corrugations and with lengthwise tabs which are bent out so that they run at right angles to said transverse corrugations.

13. Matrix according to claim 1, wherein said adjacent steel panels are prevented from axial displacement by nails or staples which produce small passageways in said steel panels when they are applied, whereby said nails or staples may remain in said matrix or can be removed again after the passageways are formed.

* * * * *